(No Model.)
H. V. HAYES & A. S. HIBBARD.
TERMINAL FOR ELECTRIC BATTERIES.
No. 455,986. Patented July 14, 1891.
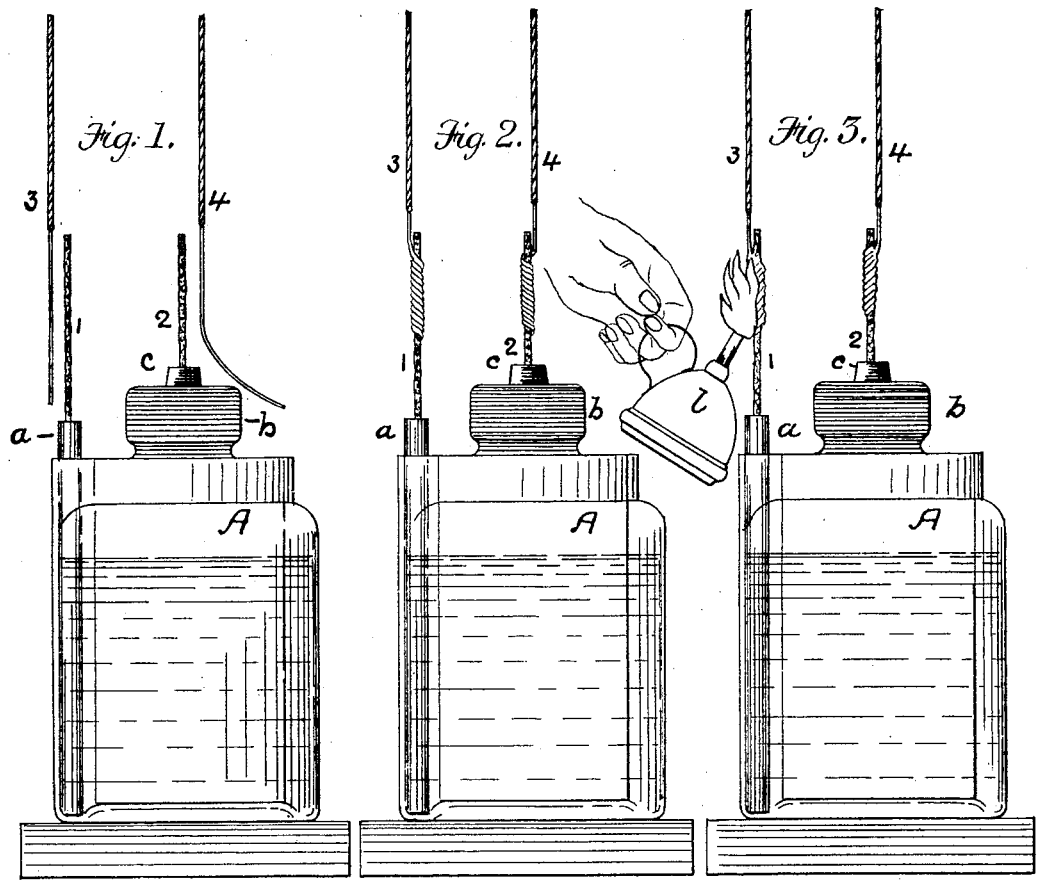
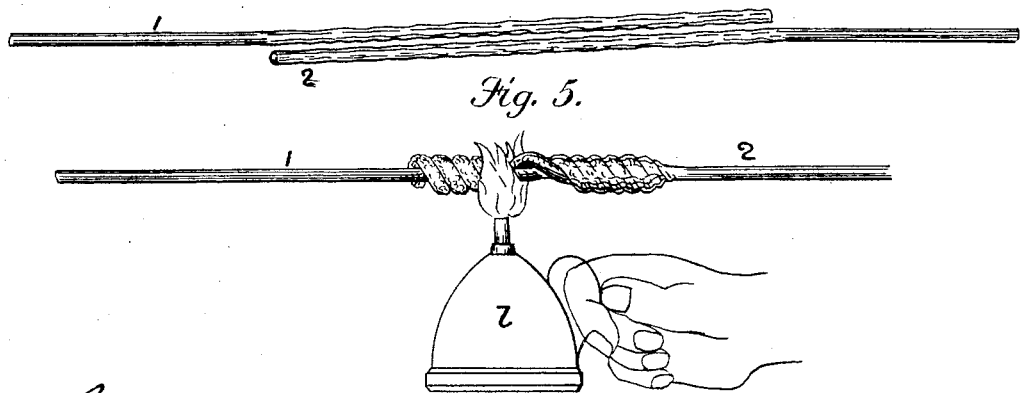
Witnesses
Inventors

UNITED STATES PATENT OFFICE.

HAMMOND V. HAYES, OF CAMBRIDGE, MASSACHUSETTS, AND ANGUS S. HIBBARD, OF MORRISTOWN, NEW JERSEY, ASSIGNORS TO THE AMERICAN BELL TELEPHONE COMPANY, OF BOSTON, MASSACHUSETTS.

TERMINAL FOR ELECTRIC BATTERIES.

SPECIFICATION forming part of Letters Patent No. 455,986, dated July 14, 1891.

Application filed January 19, 1891. Serial No. 378,266. (No model.)

*To all whom it may concern:*

Be it known that we, HAMMOND V. HAYES, residing in Cambridge, in the county of Middlesex and State of Massachusetts, and AUGUST S. HIBBARD, residing in Morristown, in the county of Morris and State of New Jersey, have invented certain Improvements in Connections for Electric Conductors and Batteries, of which the following is a specification.

We have devised an improved battery-terminal connection, which, being soldered and perfectly homogeneous, has a relatively high and absolutely constant conductivity. In a system of electrical communication, such as a telephone-exchange, in which a large number of batteries are necessarily employed, one or more at each substation for the subscriber's transmitter, we have found that the mode of making battery connections by means of terminal binding-screws is crude and unreliable. After but a short period of use, owing to the creeping action of the salts used or formed in the battery, corrosion takes place at the terminal contacts and the resistance of the circuit is largely increased. In other words, the conductivity of the battery-circuit is seriously impaired, and the energy of the battery itself, instead of being usefully employed in association with the transmitter in the initiation of voice-currents, is wasted in overcoming the abnormal resistance of its own connections. It must of course be borne in mind that in the majority of cases a telephone-battery is included together with the variable resistance and the primary helix of an induction-coil in a short office-circuit, the secondary helix of the said induction-coil being included in the main line. For this reason any undue resistance which develops in the battery-circuit is more serious than it would be were the battery-circuit of greater length or greater normal resistance, because the said undue resistance when formed constitutes a much larger proportion of the total resistance of the circuit. It thus becomes a matter of vital importance to keep the resistance of the battery-circuit at its lowest possible point. Of course it is likewise advantageous in all battery-circuits to do away with all unnecessary resistance, and our invention is applicable for this purpose with any battery and under any circumstances. It can also be utilized with advantage in the formation of joints, splices, or connections of electric or other conducting wires irrespective of the association of such wires with batteries.

The objects of our invention are to provide a splice or joint for electric conductors and battery connections which shall be easily made and whose conductivity shall be constant and relatively high.

Our invention comprises a novel method of forming such connections in a soldered joint or splice in which the solder is carried on one or both of the wires concerned, and which therefore requires only the application of a comparatively low degree of heat for its formation, and a battery-terminal connection dispensing with screws, and consisting of permanently-attached wires coated with some suitable and easily fusible metal, alloy, or solder.

In our battery connection we provide for battery-plates irrespective of material wires, preferably of copper, which are molded to the said plates. For instance, in batteries of the Leclanche type the zinc rod terminates in a wire molded into its substance, while the carbon-plate is provided, as usual, with a lead cap, into which a similar wire is molded. These wires are preferably made of considerable size—say No. 14 American gage—and they are conveniently coated by dipping in a bath of alloy fusible at a low temperature, which mode of preparation we have found to be experimentally satisfactory. To make a connection with other wires—say those of a Blake transmitter—it is only necessary to wind the wires from the transmitter or other instrument round the battery-wires and then direct upon the splice a moderate amount of heat—that of a match, candle, or small lamp being sufficient. Perfect battery connections are thus formed with great facility.

In the drawings which form a part of this specification, Figures 1, 2, and 3 indicate steps in the method of forming battery connections upon the principles herein set forth. Fig. 4 shows two wires coated with alloy preparatory to being used in jointing, and Fig. 5 indicates the finishing process of a joint made by twisting the said two wires together.

In Figs. 1, 2, and 3, A is the containing cell of the battery, $a$ the top of the zinc plate, and $b$ the lead-capped top of the carbon-plate, which latter may or may not be sealed up in a porous cup. Copper wires 1 and 2 are, as shown, attached to the plates $a$ and $b$, being molded or embedded into their substance, the wire 2 in this instance passing through a nipple $c$, which surrounds the lead cap. The wires 1 and 2 are preferably of copper, are as large as No. 14 Brown & Sharpe's gage, and are dipped in a bath of molten alloy, which fuses at a relatively low temperature, this being indicated in the drawings by the roughened or corrugated surface.

The instrument or circuit wires are indicated by the Figs. 3 and 4. These ordinarily are covered with suitable insulation, and in Fig. 1 this is shown as being stripped off at the ends, which are thus made ready for union with the battery terminals.

In Fig. 2 the bared ends of wires 3 and 4 as shown as being wound uniformly round the alloy-coated wires 1 and 2, the mechanical part of the connection being thereby formed.

Fig. 3 indicates the final step in the formation of the joint—namely, the application to it of a moderate degree of heat. This may be accomplished by allowing the flame of a candle or match to play upon the connection; but we prefer to employ a lamp $l$, as being more controllable.

The carbon connection of Fig. 3 is indicated as being already completed while the heat is in the act of being applied to the zinc connection. As soon as the heat attains to the fusing-point of the coating of alloy the latter, becoming fluid, fills up the interstitial spaces left by the winding, and the heat being withdrawn solidification instantly ensues, leaving a perfectly homogeneous soldered connection, which is not deteriorated by the chemical action of the battery and whose resistance is not impaired by the action of creeping salts. If at any time it be required to disconnect the wires so joined, it is only necessary to reapply the heat and it is easy then to unwind the circuit-wires 3 and 4.

In Fig. 4 a pair of wires 1 and 2 are shown, the ends of which have been dipped in molten metal or alloy, as evidenced by the roughness of their surfaces. In Fig. 5 the same wires have been mechanically united by the common lineman's twist-joint, and by the application of the requisite amount of heat from the lamp $l$, as shown, the alloy is caused to permeate into all interstices and crannies of the twisted wires, and a first-class soldered joint or splice is thus formed.

We claim—

1. A battery-terminal connection dispensing with binding-screws and consisting of terminal wires having one of their ends molded into or embedded in the battery-plates, respectively, and having their other ends coated by dipping or otherwise with easily fusible alloy for mechanically and chemically homogeneous attachment to circuit or instrument wires, as described.

2. The combination, substantially as hereinbefore described, of a voltaic battery and terminal attachments therefor, each consisting of a copper wire molded to its respective battery-plate and each adapted to form a soldered connection with its complementary circuit-wire by a coating of solder or easily fusible alloy applied to its free end, substantially as described.

3. The combination, substantially as hereinbefore described, of a voltaic battery, terminal connection-wires therefor molded or embedded in the battery-plates, respectively, circuit-wires for completing the circuit of the said battery, the ends of the said wires being wound over the free ends of the connection-wires, and means for soldering the joint thus formed, the said means consisting of a solder or easily fusible alloy applied as a coating to the connection-wires previous to the winding of the circuit-wires thereon, and adapted on the application of heat to fill the crevices and interstices of said winding, for the purpose specified.

In testimony whereof we have signed our names to this specification, in the presence of two subscribing witnesses, this 14th day of January, 1891.

HAMMOND V. HAYES.
ANGUS S. HIBBARD.

Witnesses as to Hammond V. Hayes:
GEO. WILLIS PIERCE,
FRANK C. LOCKWOOD.

Witnesses as to Angus S. Hibbard:
JOHN J. CARTY,
A. D. VANCE.